| United States Patent [19] | [11] | 4,414,178 |
|---|---|---|
| Smith, Jr. et al. | [45] | Nov. 8, 1983 |

[54] NICKEL-PALLADIUM-CHROMIUM-BORON BRAZING ALLOY

[75] Inventors: Murray S. Smith, Jr., Cincinnati; Mark S. Hilboldt, Fairfield; Pracheeshwar S. Mathur, Montgomery, all of Ohio

[73] Assignee: General Electric Company, Cincinnati, Ohio

[21] Appl. No.: 310,339

[22] Filed: Oct. 9, 1981

[51] Int. Cl.³ .............................................. C22C 19/04
[52] U.S. Cl. ..................................... 422/444; 420/456
[58] Field of Search ................... 75/170, 171, 172 R, 75/244, 247, 246, 545, 255, 134 N, 134 F; 420/444, 456, 463, 588

[56] References Cited

U.S. PATENT DOCUMENTS

| 2,903,352 | 9/1959 | Bredzs | 75/170 |
|---|---|---|---|
| 3,053,652 | 9/1962 | Mobley et al. | 75/171 |
| 3,089,769 | 5/1963 | Huschke, Jr. et al. | 75/171 |
| 3,155,499 | 4/1964 | Mobley | 75/134 N |
| 3,497,332 | 2/1970 | Donnelly et al. | 75/172 R |
| 3,764,307 | 10/1973 | Barb et al. | 75/170 |
| 3,853,548 | 12/1974 | Fairbanks et al. | 75/171 |
| 4,149,881 | 4/1979 | D'Silva | 75/172 R X |
| 4,283,225 | 8/1981 | Sexton et al. | 75/171 X |

Primary Examiner—Brian E. Hearn
Assistant Examiner—David A. Hey
Attorney, Agent, or Firm—Lee H. Sachs; Derek P. Lawrence

[57] ABSTRACT

An improved brazing alloy, particularly suited for use in high temperature gas turbine engines, has a composition range which exhibits X-ray inspection capability, improved stress rupture properties, good ductiity and oxidation resistance up to 1400° F. The brazing alloy consists essentially of, by weight, about 20–80% Pd, 2–13% Cr, 1–4% B, balance being Ni and incidental impurities. The brazing alloy is capable of brazing in the 1800°–2000° F. temperature range and is less costly than Au-bearing brazing alloys currently in use for brazing in this temperature range.

5 Claims, No Drawings

NICKEL-PALLADIUM-CHROMIUM-BORON BRAZING ALLOY

CROSS REFERENCE TO RELATED APPLICATION

Related to this application are co-pending and concurrently filed applications, Ser. No. 310,270 and Ser. No. 310,338, all filed on Oct. 9, 1981 and assigned to the assignee of the present invention.

BACKGROUND OF THE INVENTION

1. Field of the Invention

The present invention relates to brazing alloys, and more particularly, to Ni (nickel)—Pd (palladium)—Cr (chromium)—B (boron) brazing alloys suitable for brazing in the 1800°-2000° F. temperature range.

2. Description of the Prior Art

Application of various metals and their alloys for use as structural or operational components in high temperature operating systems such as turbomachinery for use in gas turbine engines often requires joining to form a sound, structural joint. Joining can be accomplished in a number of ways, the more common and effective being welding or brazing.

During welding, a portion of the members being joined are melted and resolidified. A weld joint can have a grain structure significantly different from the material joined and will generally have reduced mechanical properties as a result of the melting and solidification. However, during brazing, a metal or alloy generally referred to as the brazing alloy, is placed between closely fitted members to be joined, and heated to a temperature, generally referred to as the brazing temperature, sufficient to cause melting of the brazing alloy but not the alloy of the members. The brazing alloy subsequently is resolidified during cooling. A bond results principally from the combination of heat and interdiffusion of the brazing alloy with the alloy of the structural members being joined. The brazing alloy is selected to provide a sound bond which results in optimum high temperature mechanical properties across the joint.

Various factors are considered in the development, selection, and application of a brazing alloy. These factors include processing, service conditions, physical and mechanical properties of the brazing alloy and economic considerations. These factors are well known and practiced in the art.

Many aircraft gas turbine components are fabricated using brazing techniques. Most generally, the nickel-base superalloys or various high strength steels are selected as the structural materials of such components. A number of materials thus selected require that brazing be performed in the temperature range of from about 1800° F. to about 2000° F. to provide sound joints while maintaining high temperature mechanical properties.

One high-temperature nickel-base superalloy currently used as brazed structural members in high-temperature applications is an age-hardening alloy, commercially available as Inconel 718 alloy, and having a nominal composition of about 19% Cr, 5% Cb (columbium)+Ta (tantalum), 3% Mo (molybdenum), 0.6% Al (aluminum), 0.8% Ti (titanium), 53% Ni, with balance Fe (iron) and incidental impurities. As used herein, all percentages are weight percentages unless otherwise noted. Such alloy has a solution temperature in the range of 1700°-1850° F. This alloy, however, is susceptible to excessive grain growth when exposed to temperatures as high as about 2000° F., resulting in a significant reduction of mechanical properties. To avoid such grain growth and loss of properties, it is desirable to use a brazing alloy which has a brazing temperature of about 1900° F. or below.

Brazing alloys used previously within a brazing temperature range of about 1800°-2000° F. have included the gold-bearing brazing alloys, such as, for example, 82% Au (gold), 18% Ni (hereinafter referred to as 82-18), and 20.5% Au, 66.5% Ni, 5.5% Cr, 2.2% Fe, 3.5% Si (silicon), 2.1% B (hereinafter referred to as Au-6). These brazing alloys have application limitations based on their strength capability, their service temperature limit, and their ductility. The large amounts of gold present in these alloys results in very high cost which makes their selection and use unattractive.

Other, less expensive brazing alloys available for brazing in the temperature range of 1800°-2000° F. include those alloys which contain substantial amounts of silver, titanium manganese, copper or phosphorus. Such brazing alloys are not attractive for use in high-temperature gas turbine applications for various reasons. For example, silver-containing brazing alloys are very corrosive to nickel-base alloys at high temperatures experienced in aircraft gas turbines. Titanium-containing brazing alloys lack high temperature service capabilities. Manganese and copper-containing brazing alloys exhibit poor oxidation resistance above about 1000° F. Finally, the phosphorus-containing nickel-base brazing alloys produce excessive structural metal erosion and joints which are excessively brittle. Such brazing alloys have limited usefulness for high temperature applications.

Accordingly, a need exists for a less expensive, gold-free brazing alloy suitable for brazing certain high-temperature structural materials in the same temperature range as the previously discussed gold-containing brazing alloys. Additionally, the improved brazing alloy must have a better combination of strength and ductility as well as comparable or higher operating service temperature than currently available brazing alloys.

BRIEF SUMMARY OF THE INVENTION

It is a principal object of this invention to provide an improved brazing alloy having a brazing temperature in the range of 1800°-2000° F. to replace currently available gold-bearing brazing alloys.

It is another object of this invention to provide such a brazing alloy with an improved combination of higher mechanical properties along with adequate ductility and resistance to oxidation.

An additional object of this invention is to provide such a brazing alloy capable of manufacture in the form of powder, foil, tape, wire or other form suitable for various brazing applications.

It is yet another object of this invention to provide such a brazing alloy capable of application as a brazed joint between structural members by any of a variety of heating application means, and being suitable for application in original structural article manufacture as well as in subsequent repair procedures.

These and other objects and advantages will be more clearly understood from the following detailed description and specific examples which are intended to be typical of, rather than in any way limiting on, the scope of the present invention.

Briefly, the present invention provides a unique combination of alloying elements which results in an improved, less expensive brazing alloy having a brazing temperature in the range of 1800°–2000° F. for replacement of current, gold-containing brazing alloys. The brazing alloy in its broad form consists essentially of 20–80% Pd, 2–13% Cr, 1–4% B, balance being Ni and incidental impurities. In one preferred form, the alloy consists essentially of 28–32% Pd, 10–11% Cr, 2–3.5% B, balance being Ni and incidental impurities. Thus, the brazing alloy of the present invention does not contain any of the adverse elements previously discussed, i.e., silver, titanium, manganese, copper or phosphorus, other than impurity levels.

The brazing alloy of the present invention has been found to be much less expensive than current gold-containing brazing alloys that have similar brazing temperatures. For example, the current cost of Au-6 and 82–18 brazing alloys is approximately 2 times and 7 times, respectively, the current cost of the brazing alloy of the present invention. In addition, the brazing alloy of the present invention develops improved strength along with adequate ductility, improved oxidation resistance, and comparable or increased service temperature as compared to currently used gold-bearing brazing alloys.

The brazing alloy of the present invention is capable of being manufactured in the form of powder, tape, foil, wire and viscous mixture products enabling a wide range of applications.

The invention, as well as other objects, advantages and capabilities thereof, will be better understood from the following description and appended claims taken in conjunction with specific examples to follow and other aspects of the invention discussed above.

DESCRIPTION OF THE PREFERRED EMBODIMENTS

The combination of Ni, Pd, Cr, and B, previously discussed provides unexpected advantages as a brazing alloy in the 1800°–2000° F. temperature range when alloyed within the ranges of the present invention. Such a brazing alloy has heretofore been unrecognized.

The brazing alloy of the present invention includes Ni for its compatibility with nickel-base superalloys and high strength steels generally joined by brazing in the desired temperature range provided by the alloy of the present invention. Palladium is chosen because it readily forms a solid solution with many other metals, which is desirable for brazing alloys. Likewise, Pd is similar to gold in its alloying characteristics. This similarity makes it a viable substitution for gold in high-temperature brazing alloys such as those previously discussed.

The presence of Pd in the alloy of the present invention will provide a brazing alloy with sufficient density to allow for detection of braze voids by X-ray inspection techniques. Such voids within a brazed joint can lead to an unsound joint and are to be specifically avoided. X-ray inspectability of brazed joints had been an advantage previously offered only by the Au-bearing brazing alloys.

An alloy of Pd and Ni will form a solid solution with a liquidus temperature, i.e., that temperature above which all of the metal is liquid, of about 2260° F. when alloyed together, for example, in the ratio of about 60 Pd–40 Ni. The amount of Pd present can be varied from about 20% to about 80% in the presence of other elements associated with the present invention. The amounts of Ni and Pd selected within the scope of the present invention will depend upon the desired strength and ductility levels required. Generally, an increase in the amount of Pd present will result in increased ductility. Additionally, variation of the amount of B present, as will be discussed, will provide the desired brazing temperature without adversely affecting desired properties of the brazing alloy as a result of the wide range of solubility provided by the presence of Pd. Generally, the presence of B will result in reduced ductility of the brazing alloy, but in combination with the elements of the present invention adequate ductility is achieved.

Chromium is added to provide enhanced oxidation resistance and improved mechanical properties. The presence of Cr will also result in a narrowing of the liquidus-solidus temperature range in which there is both solid and liquid alloy present. The presence of Ni and Cr in combination will result in improved strength in the brazing alloy. Above about 13% Cr will result in unwanted increases in the melting point of the brazing alloy without additional benefits. Below about 2% Cr, the oxidation resistance is severely reduced. Thus, Cr is included in the range of about 2–13%.

Boron is included to function as a temperature depressant, reducing the melting point of the brazing falloy of the present invention to the desired range. The presence of about 1–4% B in combination with Ni, Pd and Cr will result in an efficient reduction of brazing temperature to within the desired brazing temperature range. In the alloy of the present invention, below about 1% B will have little temperature depressant effect and B above about 4% will reduce the brazing temperature to an undesirable level as well as adversely affect the ductility of the brazing alloy.

The presence of about 1.0–2.0% B alloyed with about 60 Pd: 40 Ni, without Cr, will provide an alloy with a brazing temperature in a desired range of 1800°–1900° F. However, the brazed joint resulting from such an alloy was found to be brittle and weaker than the alloy of this invention. Further, without the presence of Cr the brazing alloy did not exhibit high-temperature oxidation resistance.

In the alloy of the present invention, the presence of Si is specifically excluded. Its presence and association with other elements of the present invention was found to result in reduced ductility and reduced high-temperature corrosion resistance in the operating temperature range of about 1200°–1400° F. Thus, to achieve optimum properties Si is specifically excluded from the present invention.

The alloy of the present invention is easily adapable to production in powder, tape, foil and wire forms. Particularly, a brazing wire product can be produced, for example, up to about 0.040" in diameter, in a process generally associated with wire filament manufacture. In producing brazing wire by this method, the alloy is prepared without B during the filament process and then B later is added to the wire product through a diffusion process known as boronizing. Foil products can also be produced using the boronizing process as well as a new rapid solidification process which produces a foil referred to as amorphous foil. The boronizing process is a distinct advantage of this alloy as compared to the Si-containing alloys. Silicon, and any of the other common depressants, other than B, used in brazing alloys, cannot generally be diffused in a manner similar to B. Thus, a variety of brazing alloy forms are available for a wide variety of applications.

The present invention will be more fully understood from the following discussion of representative examples of alloy forms studied during the evaluation of the present invention. Such examples are not intended to be limitations on the scope of this invention.

The following table lists the composition of selected forms of such alloys within the range of and made and tested in connection with the present invention.

TABLE

| BRAZING ALLOY COMPOSITION | | | | |
|---|---|---|---|---|
| Alloy Example | Percent by Weight | | | Liquidus Temperature (°F.) |
| | Ni | Pd | Cr | B | |
| 75 | 33.3 | 59.1 | 6.1 | 1.5 | <1825 |
| 77 | 49.0 | 40.0 | 9.0 | 2.0 | <1900 |
| 80 | 57.4 | 30.0 | 10.6 | 2.0 | <1850 |
| 83 | 57.1 | 29.0 | 10.5 | 3.4 | <1800 |
| 85 | 57.1 | 30.0 | 10.5 | 2.4 | <1800 |

It will be understood that the liquidus temperature as shown in the table is that temperature for a given brazing alloy composition above which all the metal is liquid. Generally, the brazing temperature of an alloy is selected to be approximately 50° F. higher than the liquidus temperature. The increased temperature is chosen to assure that all of the alloy will be molten and that adequate flow within the brazed joint will be realized, so that a sound joint can be obtained. Additionally, the higher temperature is chosen to allow for normal temperature variations within production-type furnaces.

Testing of the brazing alloy of the present invention included: flow, wetability and erosion determinations; cast bar tensile and craze crack testing; oxidation resistance testing; shear and shear-rupture testing; low and high cycle fatigue; and, braze inspection capability determination. Primary tests were performed using sheet of the structure metal alloy previously identified as Inconel 718 Alloy. A variety of brazing alloy forms within the scope of the present invention was evaluated but the following discussion will be limited to those results obtained from testing a preferred form of this invention, Alloy 85, representative of the preferred range of 28–32% Pd, 10–11% Cr, 2–3.5% B, with the balance Ni and incidental impurities.

Six inch by 1.5 inch specimens of the above-identified structural sheet alloys were prepared using 2T overlap joints. A 2T overlap joint has a brazed length equal to twice the thickness of a single sheet used to prepare the specimen. The nominal thickness of the structural member sheets was 0.06", thus the brazed length of the overlap joint was 0.120". The specimens were machined, after brazing, to produce a 2.0"×0.5" gage section, including the overlap region. The brazed joint overlap section thus developed was 0.06 square inch.

An evaluation of 2T overlap brazed joints, described above, indicated excellent flow and wetability capability of the brazing alloy. There were no voids within the brazed joint and the fillet exhibited a well-developed feathering effect at the edges. No erosion was observed after heating at the brazing temperature for one hour, the equivalent of four normal brazing cycles. Therefore, the brazing alloy of the present invention will not adversely affect the structural integrity of the materials being joined.

Cast bar tensile specimens of brazing Alloy 85, 0.25"×2.0" long, prepared with a 0.160" dia.×1.0" gage section, were tested. The data showed that the brazing alloy of the present invention has ultimate and yield strengths greater than the 82–18 and Au-6 gold-bearing brazing alloys previously mentioned. In addition, Alloy 85 of the present invention has good ductility: greater than the previously mentioned Au-6 gold-bearing brazing alloy, although not as high as the 82–18 variety which has very high ductility as a result of the very large percentage of Au present.

Craze crack testing was performed on Inconel 718 Alloy structural metal tensile specimens having a 0.5"×2.0" gage section on one side of which was placed a layer of brazing Alloy 85 approximately 0.010" thick. The specimens were then tested in tension until cracking of the brazing alloy or structural metal occurred. This test indicates relative ductility between the brazing alloy and the structural metal system. The test results were similar to the cast bar tensile data. The preferred Alloy 85 of the present invention showed an improvement in ductility over Au-6 Alloy.

Standard T-joints were brazed with Alloy 85 of the present invention and subjected to an oxidation test in air at temperatures of 1000° F. and 1400° F. for times of 100, 500, and 1000 hours. Oxidation resistance of Alloy 85 was determined to be excellent at these test temperatures and exposures of up to 1000 hours.

Previously described 2T overlap specimens brazed with Alloy 85 were prepared and shear tested at room temperature, 1000° F., and 1200° F. Specimens were also tested in shear rupture at 1000° F. and 1200° F. Consistent with the cast bar tensile and craze crack testing, Alloy 85 was superior to Au-6 brazing alloy when tested in shear. At 1200° F., a temperature representative of actual gas turbine engine operation temperatures for the alloy of the present invention, Alloy 85 had an indicated shear strength equivalent to the 82–18 brazing alloy when brazing Alloy 85 in the form of foil was tested (though not at room temperature). Alloy 85 tested at 1200° F. in powder form produced somewhat better results than the 82–18 brazing alloy.

Shear rupture testing, on the other hand, confirmed that Alloy 85 was superior to the Au-6 and 82–18 gold-bearing brazing alloys. At 1200° F. the stress required to produce a 100-hour shear rupture life in Alloy 85 was greater than 18,000 psi (pounds per square inch), 12,000 psi for the Au-6 brazing alloy and less than 5000 psi for the 82–18 brazing alloy. At 1000° F. and a shear stress of 16,000 psi, rupture life of Alloy 85 exceeded 1000 hours.

Additionally, Alloy 85 was tested in both high and low cycle fatigue utilizing 2T overlap specimens, previously described. Low cycle fatigue testing was completed in the axial-axial mode at 900° F. and 1100° F. At 900° F., Alloy 85 was found to have comparable low cycle fatigue strength as compared with the Au-bearing brazing alloys, Au-6 and 82–18, producing a 50,000 cycle runout at a stress of 26,000 psi. At 1100° F., Alloy 85 has a greater low cycle fatigue capability than the 82–18 brazing alloy and comparable or slightly greater capability than the Au-6 brazing alloy, developing a 50,000 cycle runout at a stress of slightly greater than 20,000 psi.

High cycle fatigue testing was completed in the axial-axial mode at 600° F. and 1100° F. with results comparable to the low cycle fatigue results obtained. When compared to 82–18 brazing alloy at 1100° F., a typical environment for gas turbine engine components, Alloy 85 has better high cycle fatigue capability. It is shown that the mechanical properties of Alloy 85 at temperatures representative of gas turbine engine operating temperatures are superior to previous gold-bearing brazing alloys.

The brazing alloy of this invention, in comparison with other nickel-base brazing alloys, demonstrated excellent flow and wetability characteristics with no evidence of erosion or other attack of the structural metals tested. The combination of all these tests shows the brazing alloy of the present invention, represented by Alloy 85, provides an improved combination of mechanical and environmental resistance properties. Improved strength with adequate ductility resulting in equivalent or better resistance to both high and low cycle fatigue at elevated temperatures is produced by the alloy of this invention. Additionally, the alloy develops equivalent shear and improved shear rupture properties as compared with other nickel-base brazing alloys. Excellent oxidation resistance to 1400° F. offered by the brazing alloy of the present invention provides for greater life at elevated service temperatures than other nickel-base brazing alloys. The alloy of this invention further is less costly than currently used brazing alloys in the same temperature range and offers X-ray inspection capability of the brazed joints.

Although the alloy of the present invention has been described in connection with specific examples and embodiments, it will be understood by those skilled in the art the variations and modifications of which this invention is capable without departing from its broad scope.

What is claimed is:

1. An improved brazing alloy consisting essentially of, by weight, about 28–32% Pd, about 6–13% Cr, about 1–3.5% B, balance being Ni and incidental impurities, the alloy further characterized by the substantial absence of Si and having a brazing temperature in the range of about 1800° F.–2000° F.

2. The brazing alloy of claim 1 in which, nominally, the Pd is 30%, Cr is 10.5%, and B is 2.4%, said brazing alloy having a brazing temperature of about 1850° F.

3. The brazing alloy of claim 1 wherein said alloy is in the form of a powder.

4. The brazing alloy of claim 1 wherein said alloy is in the form of a brazing foil.

5. The brazing alloy of claim 1 wherein the alloy is in the form of a wire.

* * * * *